(12) United States Patent
Ishihara et al.

(10) Patent No.: US 7,237,952 B2
(45) Date of Patent: Jul. 3, 2007

(54) TEMPERATURE SENSOR AND SENSOR USING A RESISTANCE ELEMENT

(75) Inventors: Masato Ishihara, Anjo (JP); Takashige Saitou, Ama-gun (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/184,073

(22) Filed: Jul. 19, 2005

(65) Prior Publication Data

US 2006/0023768 A1 Feb. 2, 2006

(30) Foreign Application Priority Data

Aug. 2, 2004 (JP) ............................. 2004-225752

(51) Int. Cl.
*G01K 7/16* (2006.01)
(52) U.S. Cl. ..................................... 374/185
(58) Field of Classification Search ................ 324/331, 324/252, 207.12, 207.21; 374/163, 183, 374/185; 338/32, 32 R
See application file for complete search history.

(56) References Cited

U.S. PATENT DOCUMENTS 5,455,510 A * 10/1995 Nelson ....................... 324/252
5,601,367 A     2/1997 Nara
5,775,811 A *  7/1998 Hiraoka et al. .............. 374/185
6,252,395 B1 *  6/2001 Aoyama et al. ........ 324/207.12
6,667,682 B2 * 12/2003 Wan et al. ................. 338/32 R
6,817,760 B2 * 11/2004 Mende et al. ............... 374/152
6,896,407 B2 *  5/2005 Nomiyama et al. ......... 374/142

FOREIGN PATENT DOCUMENTS

JP        A-5-249211       9/1993

* cited by examiner

*Primary Examiner*—G. Bradley Bennett
(74) *Attorney, Agent, or Firm*—Posz Law Group, PLC

(57) ABSTRACT

A temperature sensor utilizes the temperature characteristics of a resistance element to detect the temperature by sensing a change in the temperature as a change in the resistance of the resistance element. The resistance element includes a first resistance element which is arranged at such an angle that the resistance thereof increases relative to an angular change in one direction of a magnetic vector that is imparted, and a second resistance element which is arranged at such an angle that the resistance thereof decreases relative thereto. The change in the temperature is sensed as a change in the added value of resistances of the first and second resistance elements.

11 Claims, 4 Drawing Sheets

TEMPERATURE SENSOR AND SENSOR USING A RESISTANCE ELEMENT

CROSS REFERENCE TO RELATED APPLICATION

This application is based upon, claims the benefit of priority of, and incorporates by reference the contents of Japanese Patent Application No. 2004-225752 filed on Aug. 2, 2004.

FIELD OF THE INVENTION

This invention relates generally to a temperature sensor for detecting temperature by utilizing the temperature characteristics of a resistance element.

BACKGROUND OF THE INVENTION

As is well known, the resistance of a resistance element varies based upon the temperature. In the case of a resistance element made of a ferromagnetic material such as nickel-cobalt, the resistance increases nearly linearly with an increase in the temperature. Therefore, there can be contrived a temperature sensor for detecting the temperature by utilizing the temperature characteristics of the resistance element. However, the resistance of the resistance element usually varies depending upon a change in the magnetic field, i.e., depending upon the angular change of the magnetic vector that is imparted. In an environment where the magnetic vector varies, therefore, it becomes difficult to utilize the temperature characteristics of the resistance element.

There has heretofore been proposed a temperature sensor using the resistance element such as the one disclosed in, for example, JP-A-5-249211. This temperature sensor detects the temperature by utilizing the temperature characteristics of the resistance element that is formed maintaining a line width of 6 μm.

Referring to FIG. 8, changes P in the resistance of the resistance element accompanying the angular change of the magnetic vector are represented. The change P in the resistance becomes very small when the line width of the resistance element is smaller than 6 μm in an environment where a magnetic vector of, for example, about 25 Gauss is applied. On the other hand, the resistance of the resistance element varies depending upon a change in the temperature but not dependent upon the line width of the resistance element. Therefore, the resistance of the resistance element formed maintaining a line width of 6 μm varies relying almost upon the temperature only. Therefore, the above temperature sensor makes it possible to detect the temperature by utilizing the temperature characteristics of the resistance element even in an environment where the magnetic vector undergoes the angular change.

As described above, the conventional temperature sensor surely makes it possible to detect the temperature by utilizing the temperature characteristics of the resistance element. However, as shown in FIG. 8, when a magnetic vector of a large intensity (e.g., 50 to 100 Gauss) is imparted to the resistance element, the resistance of the resistance element inevitably varies accompanying the angular change of the magnetic vector even if the line width is maintained to be not larger than 6 μm. That is, when the above conventional temperature sensor is placed in an environment where the magnetic vector having a large magnetic intensity undergoes the angular change, it is still difficult to detect the temperature relying upon the temperature characteristics of the resistance element.

SUMMARY OF THE INVENTION

In view of the above-mentioned circumstances, it is an object to provide a temperature sensor capable of detecting the temperature irrespective of the intensity of the magnetic vector by utilizing the temperature characteristics of a resistance element even in an environment in which the magnetic vector undergoes a change and to provide a sensor using the resistance element.

In order to achieve the above object according to a first aspect, there is provided a temperature sensor which utilizes the temperature characteristics of a resistance element to detect the temperature by sensing a change in the temperature as a change in the resistance of the resistance element, wherein the resistance element includes a first resistance element which is arranged at such an angle that the resistance thereof increases relative to an angular change in one direction of the magnetic vector that is imparted, and a second resistance element which is arranged at such an angle that the resistance thereof decreases relative thereto, and the change in the temperature is sensed as a change in the added value of resistances of the first and second resistance elements.

As described above, the resistance element exhibits a resistance that varies depending upon either a change in the temperature or an angular change of the magnetic vector. In an environment where the angle of the magnetic vector changes, therefore, it becomes difficult to detect the temperature relying upon the temperature characteristics of the resistance element. In this respect, the resistance element according to the above constitution includes a first resistance element which is arranged at such an angle that the resistance thereof increases relative to an angular change in one direction of the magnetic vector that is imparted, and a second resistance element which is arranged at such an angle that the resistance thereof decreases relative thereto. This constitution suppresses the amount of change in the added value of the resistances of the first and second resistance elements caused by the angular change in the magnetic vector. By sensing a change in the added value of the resistances as a change in the temperature, therefore, the temperature can be properly detected irrespective of the intensity of the magnetic vector even in an environment where the angle of the magnetic vector undergoes a change.

In this case, in particular, it is desired from a practical point of view that the first and second resistance elements be arranged to maintain such an angular relationship that the amounts of changes in the resistances caused by the angular change of the magnetic vector in one direction are cancelled by each other through the addition of the resistances. This constitution makes it possible to detect the temperature maintaining an improved precision.

Further, the first and second resistance elements are formed in the same shape using the same material, and are arranged being tilted by 90 degrees relative to each other on a plane where the magnetic vector undergoes a change. This makes it easy to set a relative relationship of the first and second resistance elements inclusive of the above-mentioned angular relationship according to which the amounts of changes in the resistances of the first and second resistance elements caused by the angular change of the magnetic vector in one direction are cancelled through the addition of the resistances.

Further, the first and second resistance elements are electrically connected in series, whereby the added value of the resistances becomes a resultant resistance of the first and second resistance elements connected in series, thereby making it easy to detect a change in the added value.

The sensor uses a resistance element for detecting the temperature and has a function for detecting the temperature by sensing a change in the temperature as a change in the resistance of the resistance element, wherein the resistance element for detecting the temperature includes a first resistance element which is arranged at such an angle that the resistance thereof increases relative to an angular change in one direction of the magnetic vector that is imparted, and a second resistance element which is arranged at such an angle that the resistance thereof decreases relative thereto, and the change in the temperature is sensed as a change in the added value of resistances of the first and second resistance elements.

According to this constitution as described above, the resistances of the first and second resistance elements change accompanying the angular change in the magnetic vector, but added value of the resistances of the first and second resistance elements is suppressed from changing in despite of the angular change in the magnetic vector. Therefore, even in an environment where the magnetic vector undergoes an angular change, the temperature can be detected irrespective of the intensity of the magnetic vector by utilizing the temperature characteristics of the first and second resistance elements.

In this case, in particular, it is desired from a practical point of view that the first and second resistance elements are arranged maintaining such an angular relationship that the amounts of changes in the resistances caused by the angular change of the magnetic vector in one direction are cancelled by each other through the addition of the resistances. This constitution makes it possible to detect the temperature maintaining an improved precision.

Further, the first and second resistance elements are formed in the same shape using the same material, and are arranged to be tilted by 90 degrees relative to each other on a plane where the magnetic vector undergoes a change. This makes it easy to set a relative relationship of the first and second resistance elements inclusive of the above-mentioned angular relationship according to which the amounts of changes in the resistances of the first and second resistance elements caused by the angular change of the magnetic vector in one direction are cancelled through the addition of the resistances.

Further, the first and second resistance elements are electrically connected in series, whereby the added value of the resistances becomes a resultant resistance of the first and second resistance elements connected in series making it easy to detect a change in the added value.

The sensor using the resistance element further includes a resistance element for magnetic detection, wherein the angular change in the magnetic vector is detected while effecting the temperature correction based upon a change in the resistance of the resistance element for magnetic detection caused by the angular change of the magnetic vector that is imparted and by the change in the temperature, and based upon a change in the resistance of the resistance element for detecting the temperature caused by a change in the temperature.

According to the above constitution, the sensor using the resistance element makes it possible to detect the angular change in the magnetic vector while effecting the temperature correction without the need of using the element for detecting the temperature (such as a thermistor) made of a resistance material different from the resistance element for magnetic detection. It further becomes possible to form the resistance element for magnetic detection and the resistance element for detecting the temperature through the same step of production, and the sensor using the resistance element for detecting the temperature can be easily produced at a decreased cost.

In this case, in particular, if the resistance element for detecting the temperature and the resistance element for magnetic detection is formed with the same line width, the angular change in the magnetic vector while more precisely correcting the temperature can be detected.

That is, the temperature of the resistance element for detecting the temperature and the temperature of the resistance element for magnetic detection are, usually, affected by the heat generated by a heat-generating element such as a power element arranged in the periphery of the resistance elements and by the Joule heat in the current path. In this case, however, a temperature differential may occur between the resistance elements resulting in a decrease in the precision of the temperature correction. In this regard, according to the above-mentioned constitution, the resistance element for detecting the temperature and the resistance element for magnetic detection are formed to maintain the same line width unlike the conventional sensor using resistance elements, suppressing the occurrence of temperature differential between the resistance element for detecting the temperature and the resistance element for magnetic detection.

As for detecting the change in the resistance of the resistance element for magnetic detection, it can be contrived, for example, to drive the resistance element or magnetic detection on a constant voltage or on a constant current. However, it has been known that a change in the resistance of the resistance element caused by a change in the temperature can be further suppressed when the resistance element is driven on a constant current. Therefore, in detecting the angular change in the magnetic vector that is imparted, it is desired from a practical point of view that the resistance element for detecting the temperature and the resistance element for magnetic detection are driven on a constant current.

DESCRIPTION OF THE PREFERRED EMBODIMENTS

Figure 1:
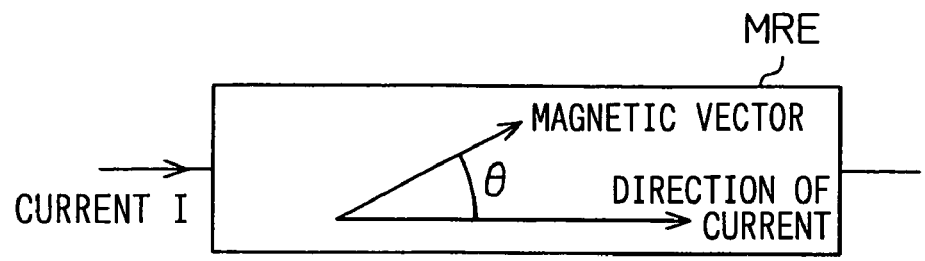
FIG. 1 is a plan view illustrating general resistance characteristics of a resistance element relative to an angular change of a magnetic vector.

First, general principles of the sensor will be described with reference to FIGS. 1 and 2.

As described earlier, the resistance of the resistance element varies depending upon the temperature. It is, therefore, contrived to detect the temperature by utilizing the temperature characteristics of the resistance element. As shown in FIG. 1, however, when the resistance element MRE is placed in an environment where the magnetic vector undergoes an angular change, the resistance R of the resistance element MRE is expressed by a relationship, $$R = R\perp \sin^2\theta + R\| \cos^2\theta \quad (1)$$

where,

θ: an angle subtended by the direction of a current I flowing into the resistance element MRE and a magnetic vector acting on the resistance element MRE;

R⊥: a resistance of the resistance element MRE of when θ=90 degrees;

R‖: a resistance of the resistance element MRE of when θ=0 degree.

Namely, the resistance R of the resistance element MRE varies depending also upon the angular change in the magnetic vector.

Figure 2:
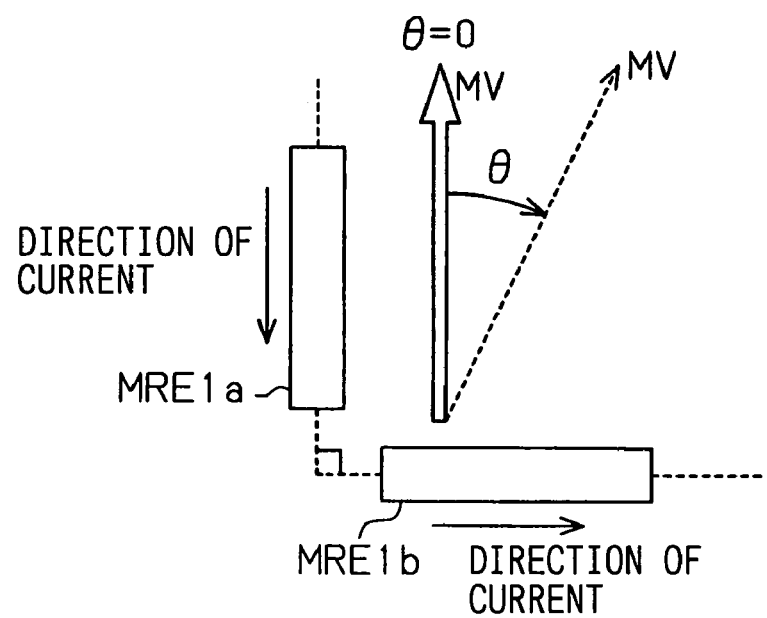
FIG. 2 is a plan view illustrating general principles of the sensor.

To cope with such a case, however, there are provided, as resistance elements, a first resistance element MRE 1a and a second resistance element MRE 1b as shown in FIG. 2 which make it possible to detect the temperature even in an environment where the magnetic vector undergoes an angular change by utilizing the temperature characteristics of the resistance elements MRE 1a and MRE 1b.

That is, in the constitution shown in FIG. 2, the first and second resistance elements MRE 1a and MRE 1b are formed in the same shape using the same material, and are arranged being tilted by 90 degrees relative to each other on a plane where the magnetic vector MV undergoes a change. Therefore, the resistances Ra and Rb of the first and second resistance elements MRE 1a and MRE 1b are expressed by the formulas, $$Ra = R\perp \sin^2\theta + R\| \cos^2\theta \quad (2)$$

$$Rb = R\perp \cos^2\theta + R\| \sin^2\theta \quad (3)$$

where,

θ: an angle subtended by the direction of a current flowing into the first resistance element MRE 1a and a magnetic vector MV acting on the first resistance element MRE 1a.

That is, as will become obvious from the following formula (4) for calculating the added value R1 of the above resistances Ra and Rb, the resistances Ra and Rb so vary that the amounts of changes thereof caused by the angular change of the magnetic vector MV are canceled by each other through the addition thereof. Therefore, if a change in the added value R1 of the resistances of the first and second resistance elements MRE 1a and MRE 1b is sensed as a change in the temperature, then, the temperature can be detected by utilizing the temperature characteristics of the resistance elements.

If the added value R1 is calculated by adding up the resistances Ra and Rb, there is obtained the following relationship concerning the added value R1, $$R1 = Ra + Rb \quad (4)$$
$$= (R\perp \sin^2\theta + R\| \cos^2\theta) + (R\perp \cos^2\theta + R\| \sin^2\theta)$$
$$= R\perp (\sin^2\theta + \cos^2\theta) + R\| (\sin^2\theta + \cos^2\theta)$$
$$= R\perp + R\|$$

First Embodiment

Figure 3:
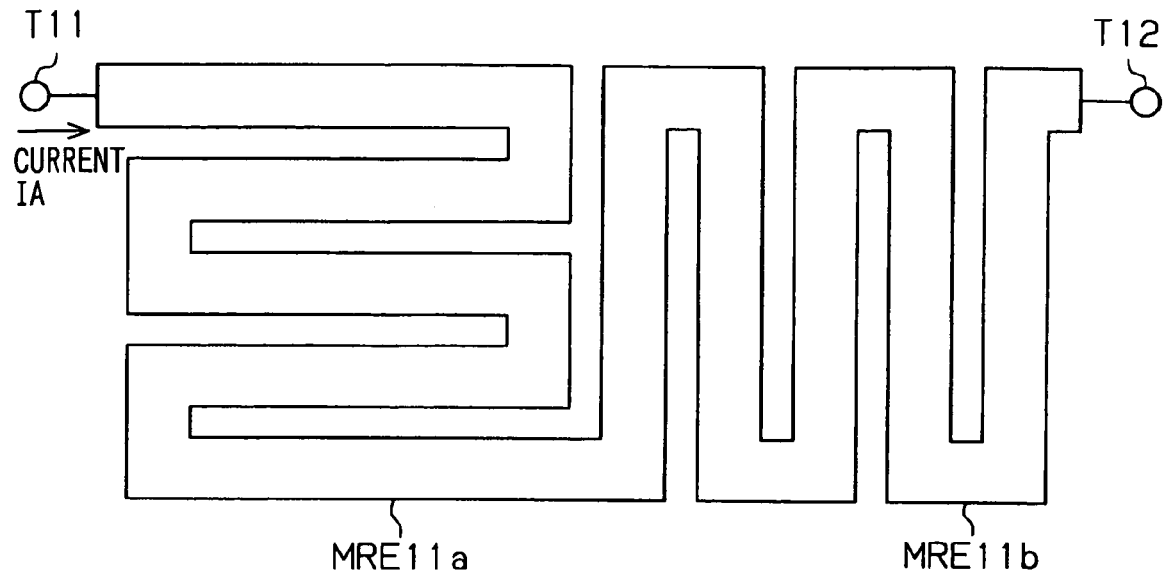
FIG. 3 is a plan view illustrating a plane structure of a first embodiment of a sensor using the resistance element.

FIG. 3 illustrates a first embodiment of a sensor using the resistance elements constituted based on the above principle. The sensor using the resistance elements of this embodiment is presumed to be the one specifically designed as a temperature sensor for detecting the temperature by utilizing the temperature characteristics of the resistance elements.

Referring to FIG. 3, the temperature sensor includes first and second resistance elements MRE 11a and MRE 11b nearly the same as the first and second resistance elements MRE 1a and MRE 1b in FIG. 2 above. That is, the first and second resistance elements MRE 11a and MRE 11b, too, are formed in the same shape using the same material (e.g., nickel-cobalt or the like), and are arranged being tilted by 90 degrees relative to each other on a plane where the magnetic vector undergoes a change.

According to this constitution which is based on the above-mentioned principle, the added value of the resistances of the first and second resistance elements MRE 11a and MRE 11b that vary accompanying the change in the magnetic vector, then, varies depending almost upon the temperature only. Therefore, even in an environment where the magnetic vector undergoes a change, the temperature can be detected by detecting a change in the added value by utilizing the temperature characteristics of nickel-cobalt.

Moreover, in this embodiment, the first and second resistance elements MRE 11a and MRE 11b are connected electrically in series. Therefore, the added value of the resistances becomes a resultant resistance of the first and second resistance elements MRE 11a and 11b connected in series, making it easy to detect a change in the added value.

A change in the added value (resultant resistance) of the above resistance values is detected relying on a constant-current drive by flowing a constant current IA to the first and second resistance elements MRE 11a and MRE 11b. Therefore, a change in the added value of the resistances can be taken out as a change in the voltage across the terminals T11 and T12 provided at both ends of the first and second resistance elements MRE 11a and MRE 11b connected in series. A change in the voltage across the terminals T11 and T12 is usually received by a processing circuit (not shown) which converts a change in the voltage into a change in the temperature. The temperature is detected through the processing by the processing circuit.

In this embodiment, the wiring between the first and the second resistance elements MRE 11a and MRE 11b is the one designed for improving the wiring resource as shown in FIG. 3.

According to the temperature sensor of this embodiment as described above, there are obtained excellent effects as described below.

(1) The first and second resistance elements MRE 11a and 11b are formed in the same shape using the same material (e.g., nickel-cobalt), and are arranged being tilted by 90 degrees relative to each other on a plane where the magnetic vector undergoes a change. Therefore, even in an environment where the magnetic vector undergoes a change, the temperature can be detected irrespective of the magnitude of the magnetic vector by utilizing the temperature characteristics of the resistance elements (nickel-cobalt).

(2) The first and second resistance elements MRE 11a and MRE 11b are connected electrically in series making it easy to detect a change in the added value of the resistances.

Second Embodiment

Next, a second embodiment of the sensor using the resistance elements will be described in detail with reference to FIGS. 4 to 7. The sensor using the resistance elements of this embodiment is presumed to be a current sensor for detecting the amount of current flowing into a current passage to be detected by sensing the angular change of the magnetic vector caused by a change in the amount of current flowing into the current passage to be detected, and is, particularly, a current sensor for sensing the angular change in the magnetic vector while effecting the temperature correction.

Figure 4:
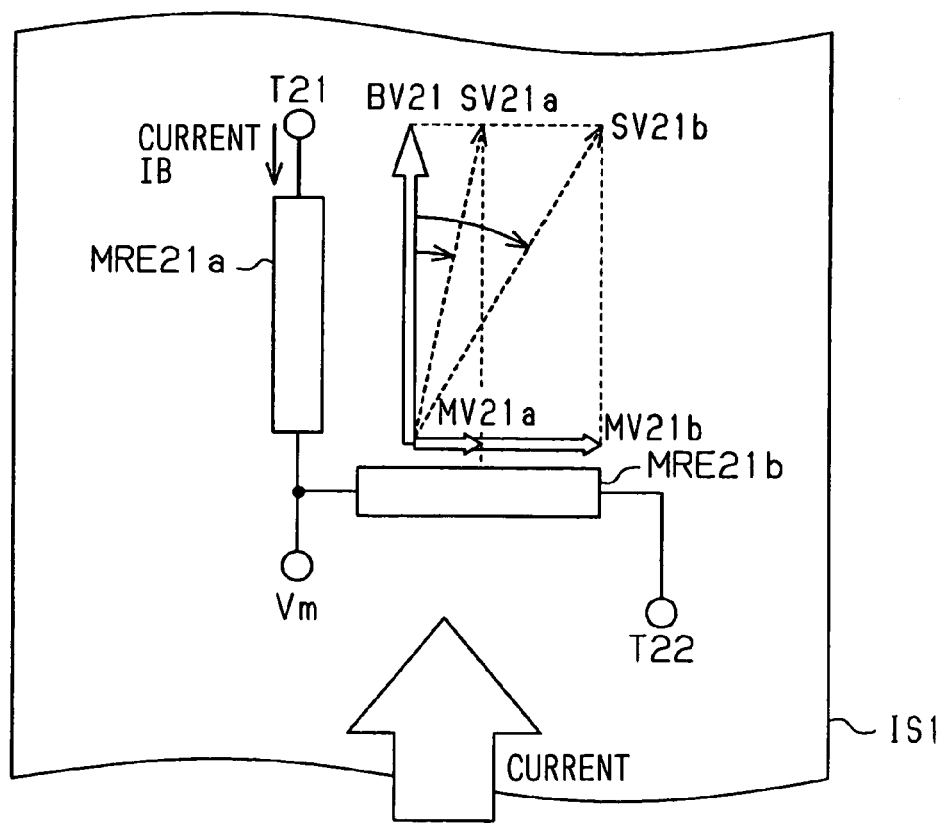
FIG. 4 is a plan view illustrating a principle for detecting the electric current by using the resistance element.

Referring, first, to FIG. 4, described below is a principle for detecting the amount of current flowing into the current passage to be detected by using a resistance element for magnetic detection.

If a current is flowing into a current passage IS1 to be detected in the direction of the arrow shown in FIG. 4, a first magnetic vector generates on the current passage IS1 to be detected acting in the directions of vectors MV21a, MV21b, etc. It is now presumed that a second magnetic vector is produced by using, for example, a bias magnet or the like at right angles with the first magnetic vector, i.e., in a direction of the vector BV21.

In this case, the first magnetic vector varies its magnitude like vectors MV21a, MV21b in proportion to the amount of electric current flowing into the current passage IS1 to be detected. On the other hand, the second magnetic vector due to the bias magnet remains constant having a magnitude of the vector BV21 irrespective of the amount of current flowing into the current passage IS1 to be detected. Therefore, the resultant vector of the first magnetic vector and the second magnetic vector undergoes an angular change accompanying a change in the amount of current flowing into the current passage IS1 to be detected.

When no current is flowing into the current passage IS1 to be detected as shown in, for example, FIG. 4, the above first magnetic vector is not generated. Therefore, the resultant vector becomes the second magnetic vector itself which acts in the direction of the vector BV21. When the current starts flowing into the current passage IS1 to be detected and the first magnetic vector acquires a magnitude of the vector MV21a due to the current, on the other hand, the resultant vector undergoes an angular change from the vector BV21 to a vector SV21a. Further, when the amount of current flowing into the current passage IS1 to be detected further increases and the first magnetic vector acquires the magnitude of the vector MV21b, the resultant vector undergoes an angular change up to the vector SV21b.

Therefore, if the angular change in the resultant vector is sensed as a change in the resistance of the resistance element for magnetic detection, the amount of current flowing into the current passage to be detected can be detected.

Concretely, the resistance element for magnetic detection includes first and second resistance elements MRE21a and MRE21b for magnetic detection. The resistance elements MRE21a and MRE21b for magnetic detection are formed in the same shape using the same material, and are arranged being tilted by 90 degrees relative to each other on a plane where the synthetic vector undergoes a change. Further, the resistance elements MRE21a and MRE21b are provided as an electrically half-bridge circuit. When the half-bridge circuit is connected across the terminals T21 and T22, a constant current IB is supplied to the half-bridge circuit from the side of the terminal T21 to drive it on the constant current.

According to the above constitution, the angular change in the resultant vector is taken out as a change in the neutral-point potential Vm of the half-bridge circuit. Therefore, the amount of current flowing into the current passage IS1 to be detected is detected upon sensing a change in the neutral-point potential Vm.

Figure 5:
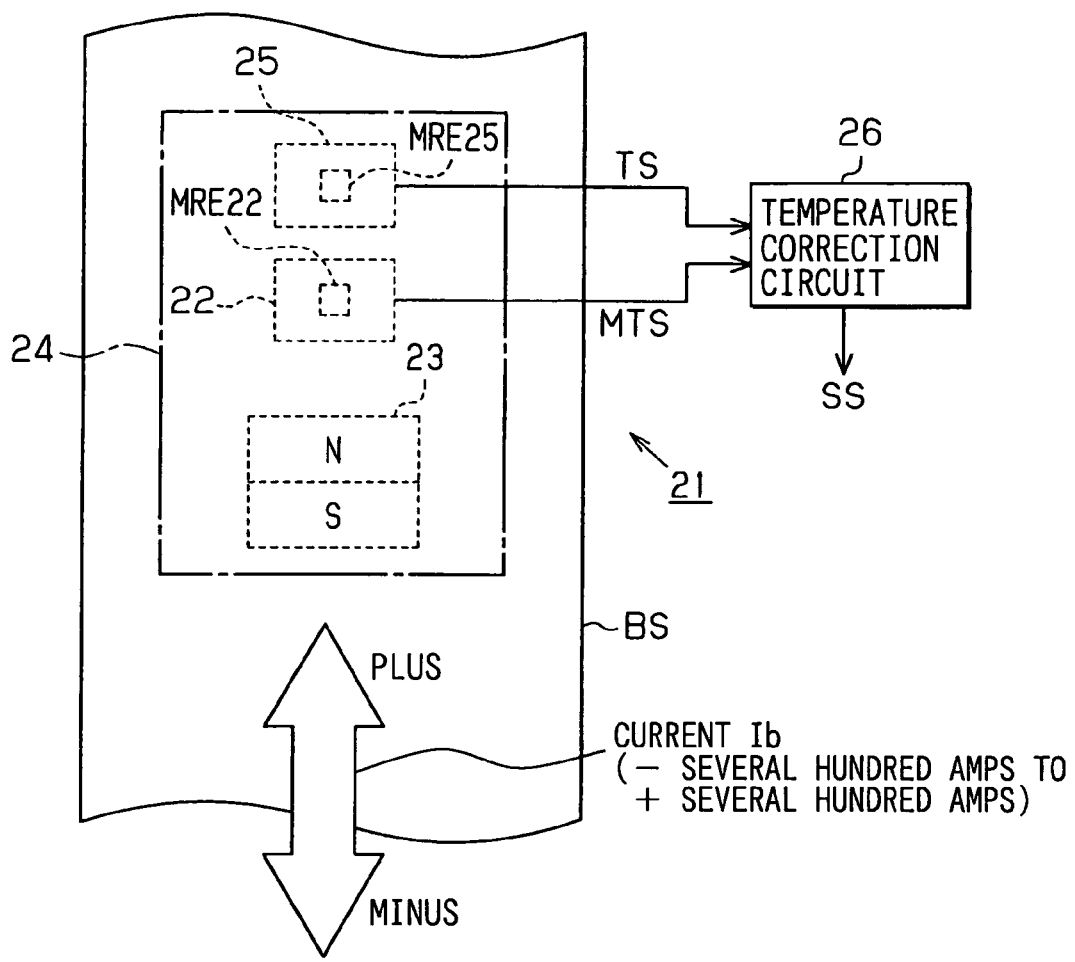
FIG. 5 includes a plan view and a block diagram illustrating the whole structure of a second embodiment of the sensor using the resistance element.
Figure 6A:
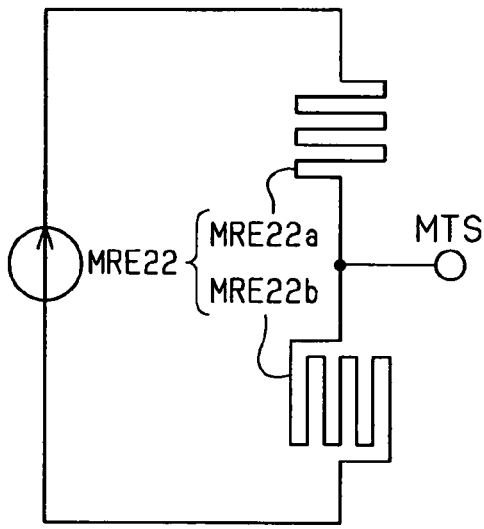
FIG. 6A is a diagram of an internal circuit of a magnetic sensor and FIG. 6B is a diagram of an internal circuit of a temperature sensor.
Figure 6B:
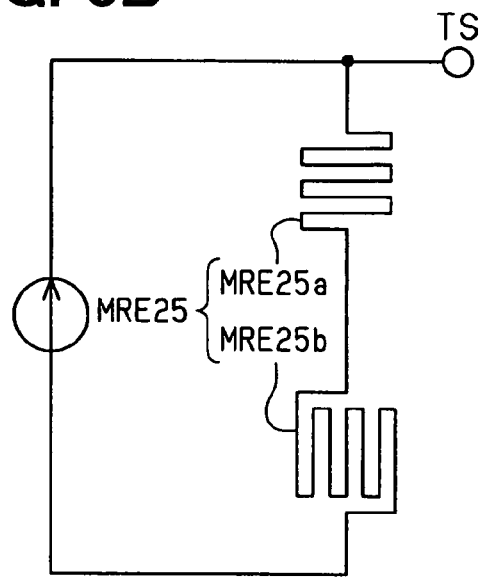
Figure 7:
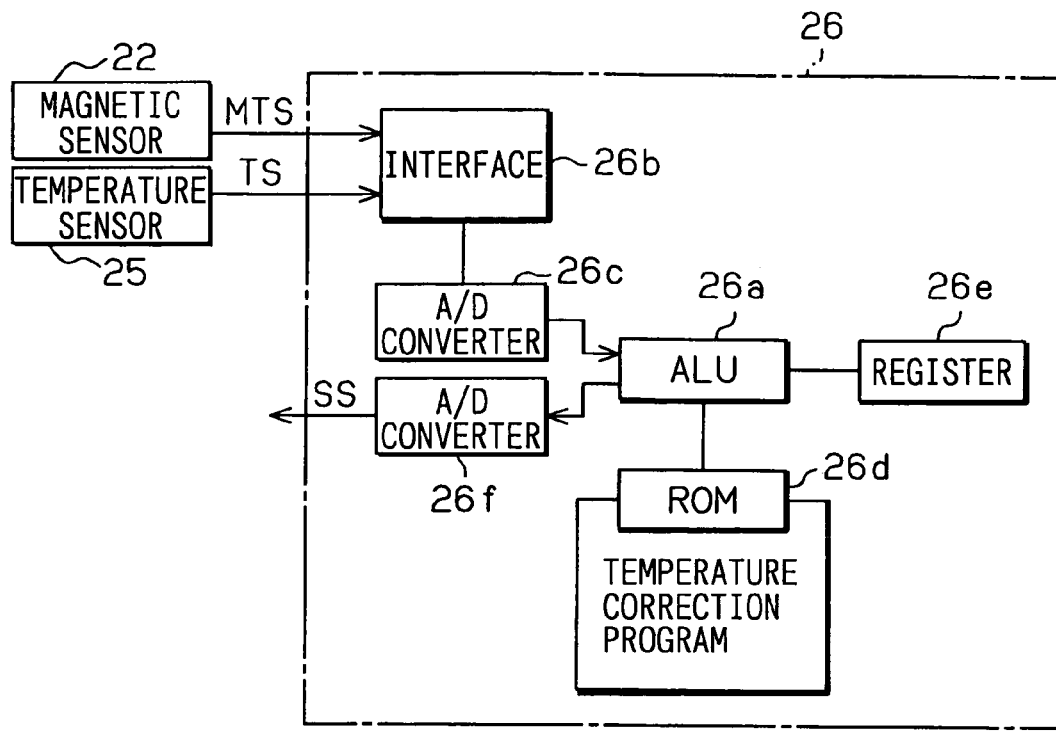
FIG. 7 is a block diagram illustrating the internal constitution of a temperature correction circuit together with an electrical relationship between the magnetic sensor and the temperature sensor.
Figure 8:
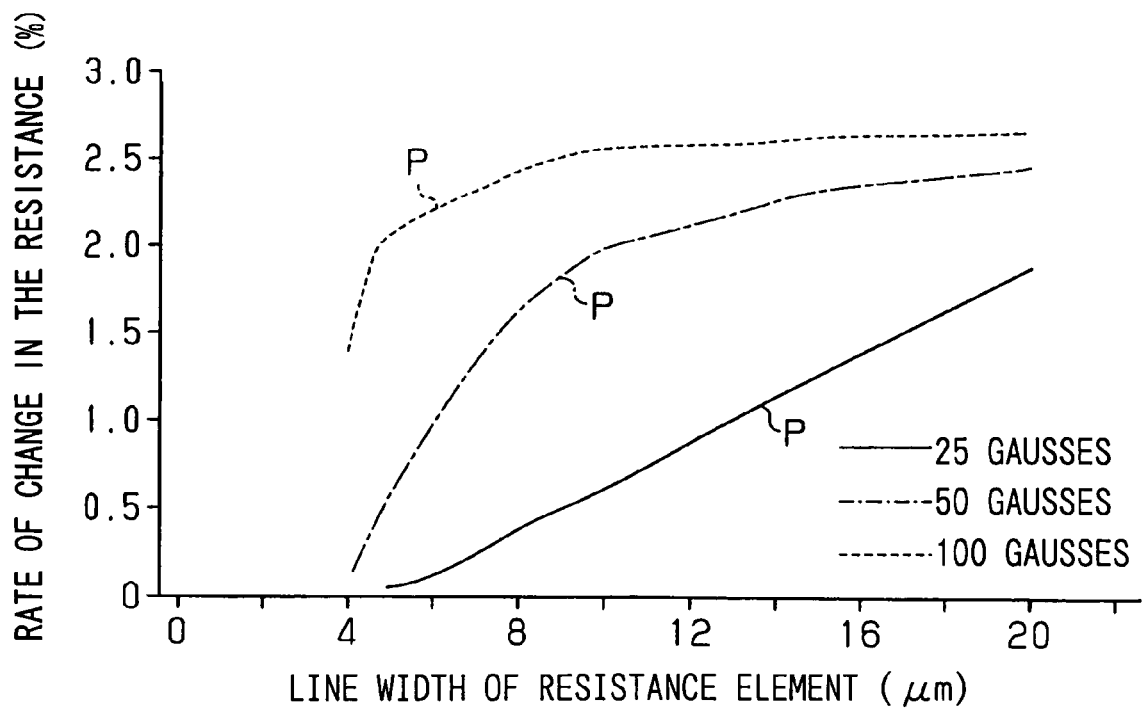
FIG. 8 is a graph illustrating changes in the resistance of a resistance element from a magnetic field.

The current sensor of this embodiment for detecting the current based on the above-mentioned principle is illustrated in FIGS. 5 to 7.

Referring to FIG. 5, the current sensor 21 includes a magnetic sensor 22 having a resistance element MRE22 for magnetic detection constituted by the above two kinds of resistance elements, and a bias magnet 23 for imparting a second magnetic vector to the resistance element MRE22, which are provided on a substrate 24. The substrate 24 in molded with a molding material such as a resin (not shown) and installed on a bus bar BS of which the current is to be detected by the current sensor 21. Through the bus bar of the embodiment, there flows a current over a wide dynamic range, i.e., a current Ib (from minus several hundreds of amperes through up to plus several hundreds of amperes) such as an output current from a car-mounted battery and a charging current into the car-mounted battery.

In this constitution as described above, the resultant vector of the first magnetic vector generated by the current Ib of the bus bar BS and the second magnetic vector generated by the bias magnet 23, undergo an angular change accompanying a change in the current Ib. Therefore, the current sensor 21 senses the angular change of the resultant vector based on the above-mentioned principle and detects the amount of current flowing through the bus bar BS.

Here, the resistance of the resistance element MRE22 for magnetic detection varies depending not only upon the angular change in the resultant vector (magnetic vector) but also upon the temperature. It is, therefore, difficult to detect the amount of electric current flowing into the bus bar BS by simply sensing a change in the resistance of the resistance element MRE22. Moreover, in this embodiment, a heavy current of, for example, positive several hundreds of amperes often flows through the bus bar BS and it is probable that the resistance element MRE22 for magnetic detection is thermally affected conspicuously by the Joule heat generated by the current flowing through the bus bar BS.

Therefore, the current sensor 21 further includes, on the substrate 24, a temperature sensor 25 which is a resistance element MRE25 for detecting the temperature which is formed in a manner as described above with reference to FIG. 3 and of which the resistance varies depending only upon a change in the temperature. Further, to detect the amount of current flowing through the bus bar BS, further, a temperature correction circuit 26 is provided for correcting the temperature which receives changes in the resistances of the resistance element MRE22 for magnetic detection and of the resistance element MRE25 for detecting the temperature, to correct the temperature based on the changes in the resistances. This makes it possible to detect the angular change in the resultant vector or to detect the amount of current flowing through the bus bar BS while correcting the temperature by the temperature correction circuit 26.

Described below are a series of operations in which changes in the resistances of the resistance element MRE22 for magnetic detection and of the resistance element MRE25 for detecting the temperature, are taken out from the magnetic sensor 22 and the temperature sensor 25, and are processed in the temperature correction circuit 26. FIGS. 6A and 6B schematically illustrate the internal circuits of the magnetic sensor 22 and the temperature sensor 25.

Referring to FIG. 6A, the resistance element MRE22 for magnetic detection includes, as described above, two kinds of resistance elements, i.e., the first and second resistance elements MRE22a and MRE22b for magnetic detection. The resistance elements MRE22a and MRE22b are formed in the same shape using the same material and are arranged being tiled by 90 degrees relative to each other on a plane where the resultant vector undergoes a change. The two kinds of resistance elements MRE22a and MRE22b electrically constitute a half-bridge circuit driven on a constant current. In this circuit, a potential at the neutral point between the resistance elements MRE22a and MRE22b is taken out from the magnetic sensor 22 as a detection signal representing a change in the resistance of the resistance element MRE22 for magnetic detection.

Referring to FIG. 6B, on the other hand, the resistance element MRE25 for detecting the temperature includes, as described above, two kinds of resistance elements, i.e., the first and second resistance elements MRE25a and MRE25b for detecting the temperature. The resistance elements MRE25a and MRE25b are formed in the same shape using the same material and are arranged being tiled by 90 degrees relative to each other on a plane where the resultant vector undergoes a change as described above. However, in this embodiment, the resistance elements MRE25a and MRE25b constituting the resistance element MRE25 for detecting the temperature, are formed maintaining the same line width as that of the resistance elements MRE22a and MRE22b constituting the resistance element MRE22 for magnetic detection.

That is, the temperatures of the resistance element MRE25 for detecting the temperature and of the resistance element MRE22 for magnetic detection are usually affected by the Joule heat of the bus bar BS. It is therefore probable that a temperature differential occurs between these resistance elements, and the precision of temperature correction may decrease. In this respect, when the resistance elements MRE25a and MRE25b are constituted maintaining the same line width as the resistance elements MRE22a and MRE22b as described above, there occurs a suppressed temperature differential between the resistance element MRE25 for detecting the temperature and the resistance element MRE22 for magnetic detection.

In the temperature sensor 25, further, the two kinds of resistance elements MRE25a and MRE25b electrically constitute a half-bridge circuit that is driven on a constant current. A change in the voltage applied to the whole resistance elements MRE25a and MRE25b is taken out from the temperature sensor 25 as a detection signal TS representing a change in the resistance of the resistance element MRE25 for detecting the temperature. The detection signals MTS and TS taken out from the sensors 22 and 25 are received by the temperature correction circuit 26 and are processed.

FIG. 7 is a block diagram illustrating the internal constitution of the temperature correction circuit 26 together with an electric relationship between the magnetic sensor 22 and the temperature sensor 25. Referring to FIG. 7, the temperature correction circuit 26 is constituted with the arithmetic unit (ALU) 26a that executes the arithmetic processing such as arithmetic operation and logic operation, as a center.

That is, the arithmetic unit 26a receives a detection signal (temperature data) TS from the temperature sensor 25 through an interface 26b and an A/D converter 26c executing the analog/digital conversion, that work to exchange signals to, and from, the magnetic sensor 22 and the temperature sensor 25. The detection signal TS is received after every predetermined time interval, and the latest detection signal TS that is received is stored in a register 26e. Next, a detection signal MTS is received from the magnetic sensor 22 through the interface 26b and the A/D converter 26c. Thereafter, a temperature correction program is read out from a memory (ROM) 26d that stores the data, and is executed. The temperature correction program is executed by making reference to the detection signal (temperature data) TS stored in the register 26e, and the detection signal MTS is corrected by the temperature based on the detection signal TS that is referred to. As also shown in FIG. 5, the detection signal MTS corrected by the temperature becomes a detection signal SS representing the amount of current flowing through the bus bar BS, and is taken out from the temperature correction circuit 26 through a D/A converter 26f that effects the digital/analog conversion.

As described above, the current sensor of the second embodiment, too, makes it possible to obtain excellent effects as described below in addition to basically obtaining the effects same as, or comparable to, the above effects (1) and (2) of the above first embodiment.

(3) On the substrate 24, there are provided the magnetic sensor 22 having the resistance element MRE22 for magnetic detection and the temperature sensor 25 comprising the resistance element MRE25 for detecting the temperature of which the resistance varies depending only upon a change in the temperature. The temperature is corrected based upon a change in the resistance of the resistance element MRE22 for magnetic detection caused by an angular change of the resultant vector and by a change in the temperature, and upon a change in the resistance of the resistance element MRE25 for detecting the temperature caused by a change in the temperature, thereby to properly detect the angular change of the resultant vector or the amount of current flowing through the bus bar BS.

According to this constitution, further, the temperature can be corrected without the need of using the element of a resistive material (e.g., thermistor) different from the resistance element MRE22 for magnetic detection. Moreover, the resistance element MRE22 for magnetic detection and the resistance element MRE25 for detecting the temperature can be formed through the same step of production. It is therefore easy to produce the sensor using the resistance element for detecting the temperature at a decreased cost.

(4) The resistance elements MRE25a and MRE25b constituting the resistance element MRE25 for detecting the temperature, are formed maintaining the same line width as the resistance elements MRE22a and MRE22b constituting the resistance element MRE22 for magnetic detection. It is therefore allowed to suppress the occurrence of the temperature differential between the resistance element MRE25 for detecting the temperature and the resistance element MRE22 for magnetic detection, and the temperature is corrected more accurately by the temperature correction circuit 26.

(5) The resistance element MRE25 for detecting the temperature and the resistance element MRE22 for magnetic detection are driven on a constant current. It is therefore made possible to suppress the amount of change in the resistance of the resistance element caused by a change in the temperature.

Other Embodiments

The above-mentioned embodiments can be put into practice being modified in a manner as described below.

To detect changes in the resistances of the resistance element for magnetic detection and of the resistance element for detecting the temperature, the resistance element for magnetic detection and the resistance element for detecting the temperature may be driven on either a constant current or a constant voltage.

The resistance element for magnetic detection and the resistance element for detecting the temperature need not necessarily be formed to maintain the same line width.

As the temperature sensor, the first and second resistance elements constituting the resistance element for detecting the temperature need not necessarily be formed electrically in series. For instance, changes in the resistances of the first and second resistance elements may be separately detected, and the resistances may be added up together to detect the temperature.

The first and second resistance elements constituting the resistance element for detecting the temperature may be arranged in any manner provided it suppresses the amount of change in the added value of the resistances of the first and second resistance elements caused by an angular change in the magnetic vector, and the temperature can be detected relying upon this arrangement.

As the resistance element for detecting the temperature, there can be used ferromagnetic metals such as nickel-cobalt, permalloy and the like, as well as compound semiconductors such as indium-antimony, gallium-arsenic and the like. That is, even by using a resistance element of which the resistance does not linearly vary accompanying a change in the temperature, the temperature can be detected by utilizing the temperature characteristics thereof provided the temperature characteristics of the resistance element have been clarified.

What is claimed is:

1. A temperature sensor which utilizes the temperature characteristics of a resistance element to detect the temperature by sensing a change in the temperature as a change in the resistance of the resistance element, wherein the resistance element includes a first resistance element which is arranged at such an angle that the resistance thereof increases relative to an angular change in one direction of a magnetic vector that is imparted, and a second resistance element which is arranged at such an angle that the resistance thereof decreases relative thereto, and the change in the temperature is sensed as a change in the added value of resistances of the first and second resistance elements.

2. A temperature sensor according to claim 1, wherein the first and second resistance elements are arranged to maintain such an angular relationship that the changes in the resistances caused by the angular change of the magnetic vector in one direction are cancelled by each other through the addition of the resistances.

3. A temperature sensor according to claim 2, wherein the first and second resistance element are formed in the same shape using the same material, and are arranged to be tilted by 90 degrees relative to each other on a plane where the magnetic vector undergoes a change.

4. A temperature sensor according to claim 1, wherein the first and second resistance elements are electrically connected in series.

5. A sensor using a resistance element for detecting the temperature and having a function for detecting the temperature by sensing a change in the temperature as a change in the resistance of the resistance element, wherein the resistance element for detecting the temperature includes a first resistance element which is arranged at such an angle that the resistance thereof increases relative to an angular change in one direction of the magnetic vector that is imparted, and a second resistance element which is arranged at such an angle that the resistance thereof decreases relative thereto, and the change in the temperature is sensed as a change in the added value of resistances of the first and second resistance elements.

6. A sensor using a resistance element according to claim 5, wherein the first and second resistance elements are arranged to maintain such an angular relationship that the amounts of changes in the resistances caused by the angular change of the magnetic vector in one direction are cancelled by each other through the addition of the resistances.

7. A sensor using a resistance element according to claim 6, wherein the first and second resistance elements are formed in the same shape using the same material, and are arranged to be tilted by 90 degrees relative to each other on a plane where the magnetic vector undergoes a change.

8. A sensor using a resistance element according to claim 5, wherein the first and second resistance elements are electrically connected in series.

9. A sensor using a resistance element according to claim 5, further including a resistance element for magnetic detection, wherein the angular change in the magnetic vector is detected while effecting the temperature correction based upon a change in the resistance of the resistance element for magnetic detection caused by the angular change of the magnetic vector that is imparted and by the change in the temperature, and based upon a change in the resistance of the resistance element for detecting the temperature caused by the change in the temperature.

10. A sensor using a resistance element according to claim 9, wherein the resistance element for detecting the temperature and the resistance element for magnetic detection are formed maintaining the same line width.

11. A sensor using a resistance element according to claim 5, wherein the resistance element for detecting the temperature and the resistance element for magnetic detection are driven on a constant current, respectively.

* * * * *